United States Patent [19]
Thevenaz

[11] 3,939,975
[45] Feb. 24, 1976

[54] PROJECTION CASSETTE

[75] Inventor: Jean Thevenaz, Grandson, Switzerland

[73] Assignee: Bolex International SA, Ste. Croix, Switzerland

[22] Filed: Nov. 15, 1973

[21] Appl. No.: 415,932

[30] Foreign Application Priority Data
May 11, 1973 Switzerland.......................... 6844/73

[52] U.S. Cl. ................. 206/387; 206/316; 206/393
[51] Int. Cl.² ........................................ B65D 85/672
[58] Field of Search ........... 206/316, 389, 387, 393; 242/137, 146, 129.5, DIG. 1

[56] References Cited
UNITED STATES PATENTS
3,638,788  2/1972  Solomon............................. 206/387
3,747,745  7/1973  Esashi et al........................ 206/387

FOREIGN PATENTS OR APPLICATIONS
220,847     9/1961  Austria ............................... 206/387
1,165,004   9/1969  United Kingdom................. 206/387

Primary Examiner—William Price
Assistant Examiner—Joseph M. Moy

[57] ABSTRACT

A projection cassette for containing two rolls of silent or sound cinematographic film lying side by side in the same plane, the cassette comprising a case and a lid and having a removable means which when removed forms an opening in the cassette sufficiently large to allow the introduction of at least one of the elements making up a sound reading device or to allow a loop of film to be extracted from the case for sound reading.

3 Claims, 7 Drawing Figures

PROJECTION CASSETTE

FIELD OF INVENTION

The present invention relates to a projection cassette and more particularly to a new and improved cassette adapted to contain two rolls of cinematographic film, which film can be silent or with soundtrack, arranged side by side in the same plane.

BACKGROUND

Film cassettes for the projection of silent film are already known, in which the film is wound onto two standard spools or onto two rotatable cores mounted side by side in the cassette. These cassettes are not capable of containing sound film since there is no way enabling the film to be engaged by a sound reading mechanism.

SUMMARY OF INVENTION

The present invention proposes to avoid this disadvantage by having in the case and/or the lid of the cassette an opening sufficiently large to allow at least one of the parts making up a sound reading device to be introduced or to extract a loop of film from the case for sound reading.

In a preferred embodiment of the present invention, the cassette contains a spool and a take-up core arranged side by side in the same plane inside the case and has a film-gate in one side. When a silent film is projected, the film follows the normal route from the spool onto the take-up core passing in front of the film-gate, the forward movement being achieved by a mechanical means such as a claw or any other known intermittent film drive. When a sound film (ie, one with a magnetic or optical soundtrack along its edge) is projected, it is necessary to form a loop of film after the film-gate so that the intermittent movement of the film for projection may be transformed into continuous movement for sound reading and establish the predetermined distance between the respective position of the film-gate and the sound read head.

The cassette, according to the invention, comprises means for projection either silent films, or sound films when an opening is made in the case and/or the lid thereof after the film-gate along the path of the film.

In one embodiment there is provided a zone of lower breakage resistance in the case and/or lid which may be removed for the introduction of one or several parts of a sound reading device, or for extracting a loop of film. This zone may, for example, be moulded with the rest of the case but separated by a groove or it may be made of a mechanically different material from the rest of the case.

In another embodiment a sliding part is provided in the cassette which part can open a portion of the case and/or lid and simultaneously extracts a loop of film from the cassette in order for it to run through a reading device outside the cassette.

DRAWINGS

The present invention will be better understood after referring to the description of several embodiments of the invention and the accompanying diagrams in which.

DETAILED DESCRIPTION

Figure 1:
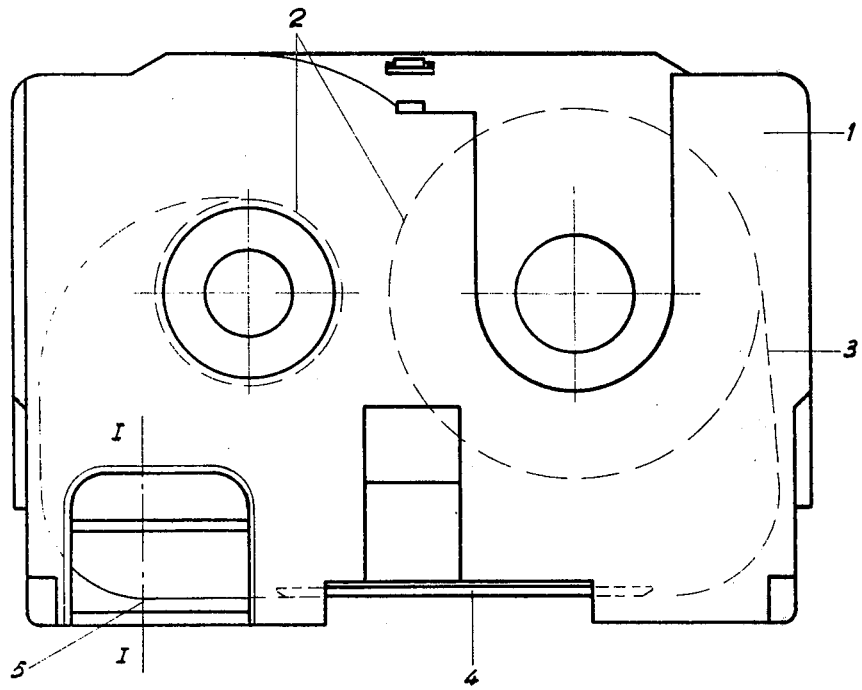
FIG. 1 shows a cassette provided with an opening through which a sound reading device may be introduced or a loop of film may be extracted for sound reading.
Figure 2:
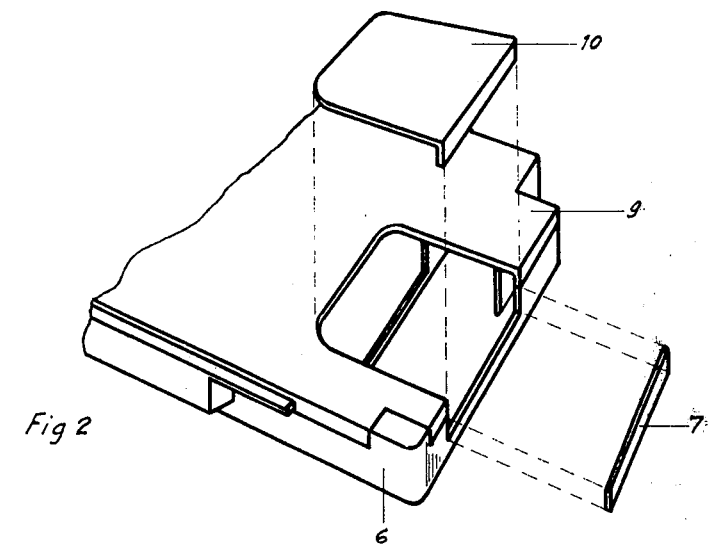
FIG. 2 is a perspective of part of a cassette shown in FIG. 1 and illustrates the means by which an opening may be made in the case or the lid of the cassette.
Figure 3:
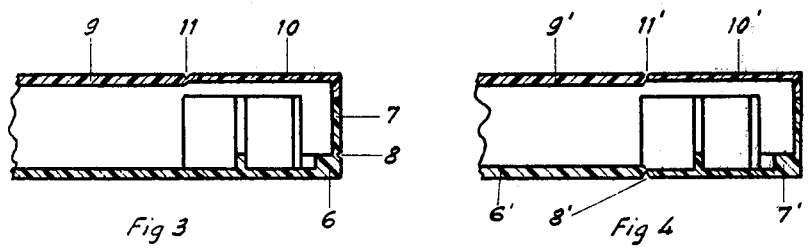
FIG. 3 is a partial section through I—I in FIG. 1.

In FIGS. 1 to 3 the cassette 1 contains two rolls 2 of a cinematographic film 3 lying side by side in the same plane. A film-gate 4 is located in one of the lateral surfaces. A zone of reduced resistance to breakage, described more fully with reference to FIGS. 2 and 3, is formed in the cassette preferably near and after the gate relative to the travel path of film 3.

In the surface with the projection-window of gate 4 of the case 6 there is a zone 7 separated from the rest of the case by a groove 8 of low resistance to breakage. In the same way the lid 9 has a zone 10 separated from the rest of the case by a groove 11 which makes it possible to detach this part 10 cleanly from the rest of the lid.

Figure 4:
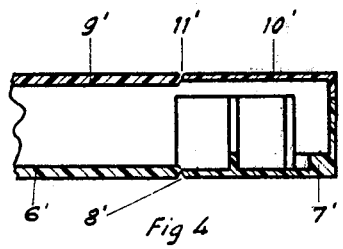
FIG. 4 is similar to FIG. 3 showing a section of part of another embodiment of a cassette in which an opening has been made in the bottom of the case corresponding with that in the lid.

The cassette in FIG. 4 has two corresponding zones 7' and 10' in its case 6' and in its lid 9' which are separated from the rest of the cassette by low breakage resistant grooves 8' and 11' respectively.

In operation, each cassette (of FIGS. 3 and 4) when intact can be used for silent films. When used for sound films the case, by application of pressure with the fingers, may be broken cleanly along the grooves intended for this purpose, and one or more parts making up the sound read head (not shown) may be introduced or a loop of film may be extracted for sound reading through the opening thus produced.

Figure 5:
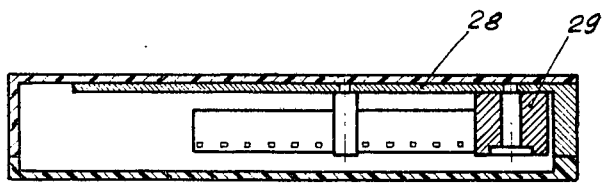
FIGS. 5 and 6 are a top-view and a section of another embodiment of a cassette showing a movable member for making an opening in the case and for extracting a loop of film.
Figure 6:
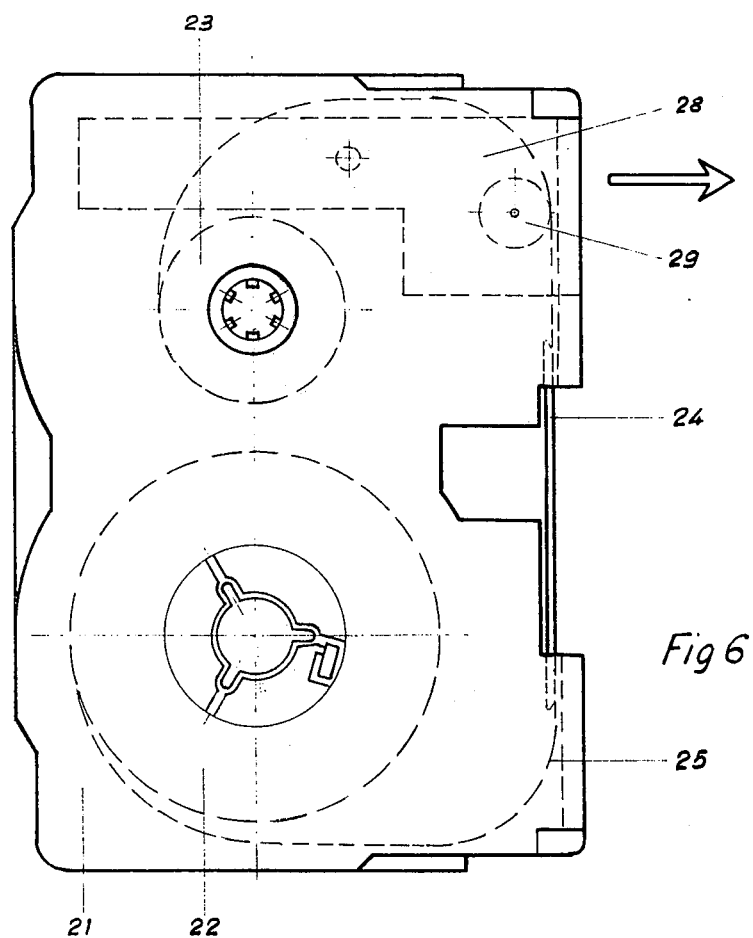
Figure 7:
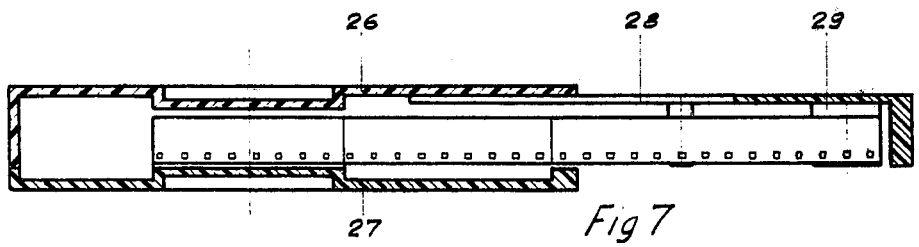
FIG. 7 is a section of FIG. 6 showing the member in an extended position.

In FIGS. 5 and 6, a cassette 21 contains a spool 22 for carrying film (such as super 8) and a take-up core 23. Film 25 is moved by known conventional means past a film-gate 24. The cassette is made up of a lid 27 attached to a case 26 by hinges (not shown). On the under side of the case 26 a rod-like member 28 is mounted to slide along lateral guides (not shown). A roller 29 rotatable round an axle approximately perpendicular to member 28 is mounted near the end of member 28. When member 28 is pulled in the direction indicated by the arrow (FIG. 6) the film which runs round the cylindrical roller forms a loop outside the cassette (FIG. 7). The cassette may then be mounted in an apparatus equipped with a sound read head or the parts making up the sound read head may be introduced into the loop.

It will be understood that other and further modification can be made to the embodiments of the invention disclosed herein without departing from the spirit and scope of the present invention.

What is claimed is:

1. A cassette for storing alternatively at least two different kinds of information-bearing strips, the strip of a first kind having a single track of a first information type whereas the strip of a second kind has at least one additional information type coded thereon, walls forming a cassette case to protect the strip contained, means for forming a loop of said strip within the cassette case, a first information-handling zone on at least one of said walls for guiding said loop of strip to enable handling said first information type, the improvement comprising wall portions defining a second information-handling zone on at least one of the walls within the range of said loop, said wall portions being connected to the remainder of the cassette case by at least one predetermined breaking point to facilitate removing said wall portions and forming an opening for handling said additional information types if a strip of said second kind is stored within the cassette.

2. A cassette as set forth in claim 1 wherein said wall portions comprise at least at the breaking point a material different from that of the remainder of the cassette case.

3. A cassette as in claim 1 wherein said predetermined breaking point is separated by at least one groove which allows said zone to be removed cleanly and in which said zone is molded in one piece with the other parts of the cassette.

* * * * *